F. I. THAYER.
OUTLET BOX.
APPLICATION FILED SEPT. 15, 1910.
982,193.
Patented Jan. 17, 1911.
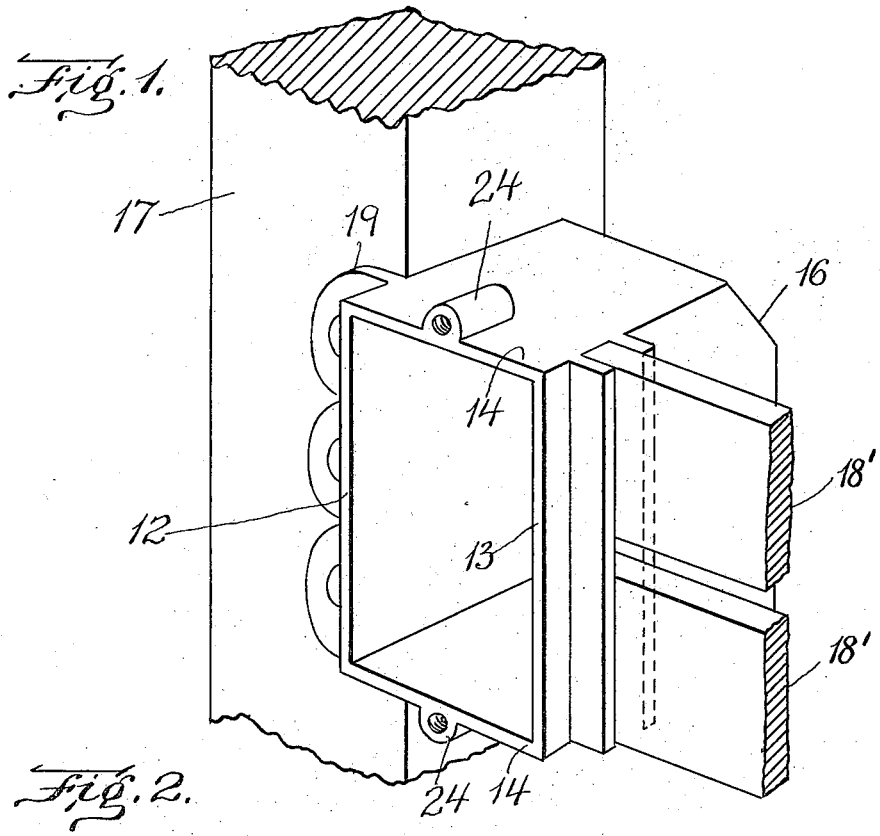
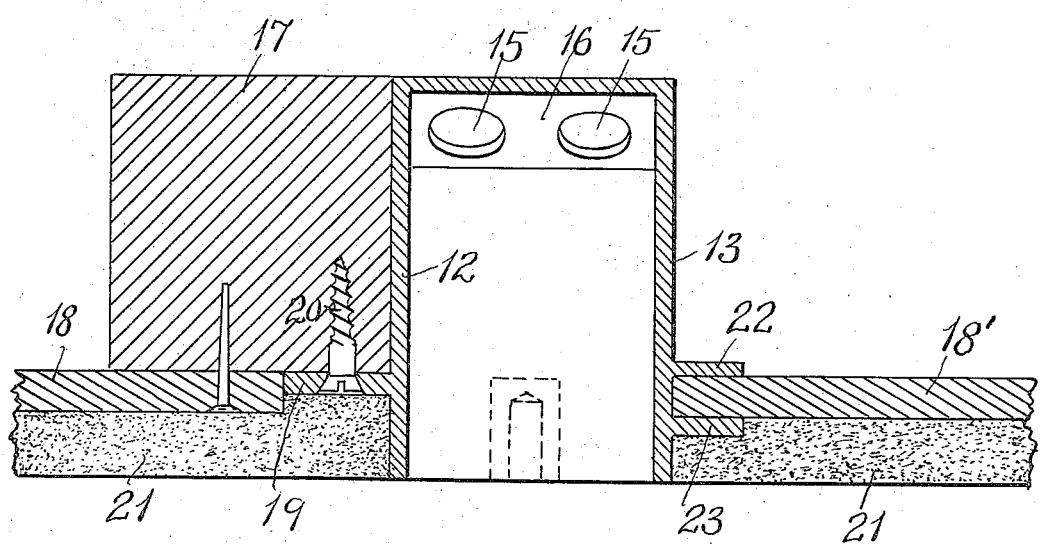
Witnesses:
F. C. Roulstone
E. Batchelder
Inventor:
Fred I. Thayer
by Wright, Brown, Quinby & May
Attys.

UNITED STATES PATENT OFFICE.

FRED IRVING THAYER, OF FARMINGTON, NEW HAMPSHIRE.

OUTLET-BOX.

982,193.     Specification of Letters Patent.    Patented Jan. 17, 1911.

Application filed September 15, 1910. Serial No. 582,159.

*To all whom it may concern:*

Be it known that I, FRED I. THAYER, of Farmington, in the county of Strafford and State of New Hampshire, have invented certain new and useful Improvements in Outlet-Boxes, of which the following is a specification.

This invention relates to outlet boxes used in electrical installation in buildings, the box being adapted to be incorporated in a wall or partition and to contain an electric switch.

The invention has for its object to provide an outlet box adapted to be quickly and conveniently incorporated in a wall or partition and to be engaged with the laths and plaster of said partition with the minimum expenditure of time and labor.

The invention consists in the improvements which I will now proceed to describe and claim.

Of the accompanying drawings which form a part of this specification,—Figure 1 represents a perspective view showing an outlet box embodying my invention engaged with a wall stud and with laths forming parts of a partition. Fig. 2 represents a horizontal section of the same, showing the lath-and-plaster portion of the wall or partition completed.

Similar reference characters indicate the same or similar parts in all the figures.

In carrying out my invention I provide an outlet box made of cast iron or sheet steel, and having an open front formed by side walls 12, 13 and end walls 14, the outer edges of said walls being flush with each other and forming the margin of the opening into the box. The size of the box is such that it is adapted to contain the usual switch employed to connect and disconnect the electric wires which enter the box through suitable openings 15 formed in the rear wall or back of the box, said back in this case having inclined faces 16 in which the openings 15 are formed.

The side 12 of the box is adapted to bear against a wall stud or upright 17 forming a support for laths 18 nailed to the outer face of said stud as usual. The side 12 is provided with a laterally extending flange 19 adapted to bear on the outer side of the stud 17 and to receive attaching screws 20 or other fastening devices which secure the box to the stud. The inner face of the flange 19 is separated from the margin of the front opening of the box by a space which substantially corresponds to the total thickness of a partition composed of laths 18 and a plaster coating 21 applied thereto, the arrangement being such that when the box is installed the outer face of the plaster coating is substantially flush with the face of the box, as shown by Fig. 2. The opposite side 13 is provided with two lath-engaging flanges 22 and 23 which are separated by a space adapted to receive the ends of laths 18'. The outer face of the inner flange 22 is substantially flush with or in alinement with the inner face of the stud-engaging flange 19, the inner flange 22 being adapted to bear against the inner sides of the laths 18' while the inner side of the outer flange 23 is adapted to bear against the outer sides of said laths.

In installing the box the side 12 is placed against one side of the stud 17 with the flange 19 bearing on the outer face of the stud. Fastenings 20 are then inserted, securing the box to the stud. The laths 18 are then nailed to the stud and the laths 18' which otherwise would be continuous with the laths 18 are inserted at their ends between the flanges 22 and 23, the laths 18' being thus supported against lateral displacement by said flanges and held in alinement with the laths 18. It will be seen, therefore, that the box adapted as described to be attached at one side to a stud, and having at the opposite side flanges adapted to engage and laterally support the ends of laths interrupted by the box, enables the installation of the box to be effected very quickly and conveniently, without the necessity of providing independent supports, such as cleats, for the interrupted laths, these being engaged directly with the flanges 22 and 23 of the box.

The box may be provided with a suitable cover or closure adapted to close the open front of the box, said cover being attached preferably by screws which enter threaded holes in bosses 24 formed on the ends 14 of the box, said bosses being formed so that the continuous laths above and below the box can pass across them.

It will be seen that the operation of attaching the box to the stud 17, usually performed by an electrical worker, prepares the way for the lather, whose labor is greatly facilitated by the flanges 22 and 23, these providing all the support that is requisite for the interrupted laths 18'.

I claim:—

An outlet box having an open front and closed sides the forward edges of which form the margin of a front opening, a stud engaging flange on one of said sides having its inner face separated from said margin by a space substantially corresponding to the total thickness of a lath-and-plaster partition, said flange being adapted for attachment to a wall stud, and two lath-engaging flanges on the opposite side, separated from each other by a space substantially corresponding to the thickness of a lath, the inner flange having its outer face substantially flush with the inner face of the stud-engaging flange, whereby the inner sides of laths, interrupted by the box, may be supported by said inner flange in alinement with laths nailed to the stud, the outer lath-engaging flange supporting the outer sides of the said interrupted laths.

In testimony whereof I have affixed my signature, in presence of two witnesses.

FRED IRVING THAYER.

Witnesses:
EDWIN LE GRO,
ALICE LE GRO.